United States Patent

Legille et al.

[11] Patent Number: 4,601,617
[45] Date of Patent: Jul. 22, 1986

[54] DEVICE FOR INTRODUCING DOSED QUANTITIES OF PULVERIZED SOLID MATERIALS INTO A CARRIER GAS STREAM

[75] Inventors: Edouard Legille, Luxembourg; Léon Ulveling; Pierre Mailliet, both of Howald, all of Luxembourg

[73] Assignee: Paul Wurth S.A., Luxembourg, Luxembourg

[21] Appl. No.: 721,566

[22] Filed: Apr. 10, 1985

[30] Foreign Application Priority Data

Apr. 11, 1984 [LU] Luxembourg .......................... 85299

[51] Int. Cl.⁴ .............................................. B65G 53/46
[52] U.S. Cl. .................................................. 406/129
[58] Field of Search ................. 406/50, 129, 128, 131; 222/548, 553

[56] References Cited

U.S. PATENT DOCUMENTS 1,271,107 7/1918 Weller ............................ 406/129 X
3,179,471 4/1965 Savage .

FOREIGN PATENT DOCUMENTS 20698 of 1910 United Kingdom .
371147 5/1973 U.S.S.R. .
426933 2/1975 U.S.S.R. .

Primary Examiner—Jeffrey V. Nase
Attorney, Agent, or Firm—Fishman & Dionne

[57] ABSTRACT

A device for introducing dosed or proportioned quantities of pulverized solid materials into a carrier gas stream is presented. The device comprises a housing which defines a flow chamber in the axial direction for the flow of pressurized fluid or carrier gas. The housing also has a side aperture therethrough. The side aperture is connected to a container holding pulverized materials. Coaxial inner and outer sleeves, at least one of which is capable of rotation, are located within the housing. The outer sleeve communicates with the aperture while the inner sleeve has an axial bore which provides a passage for the carrier gas. Upon rotation of a sleeve, slots provided on each sleeve will align and overlap with each other and with the aperture to define a variable sized passage between the container and axial bore whereby the pulverized material is delivered therethrough to the carrier gas stream. The rotating sleeve forms an integral portion of a drive shaft which is mounted coaxially in the housing by means of bearings, the drive shaft being movable in the axial direction.

6 Claims, 1 Drawing Figure

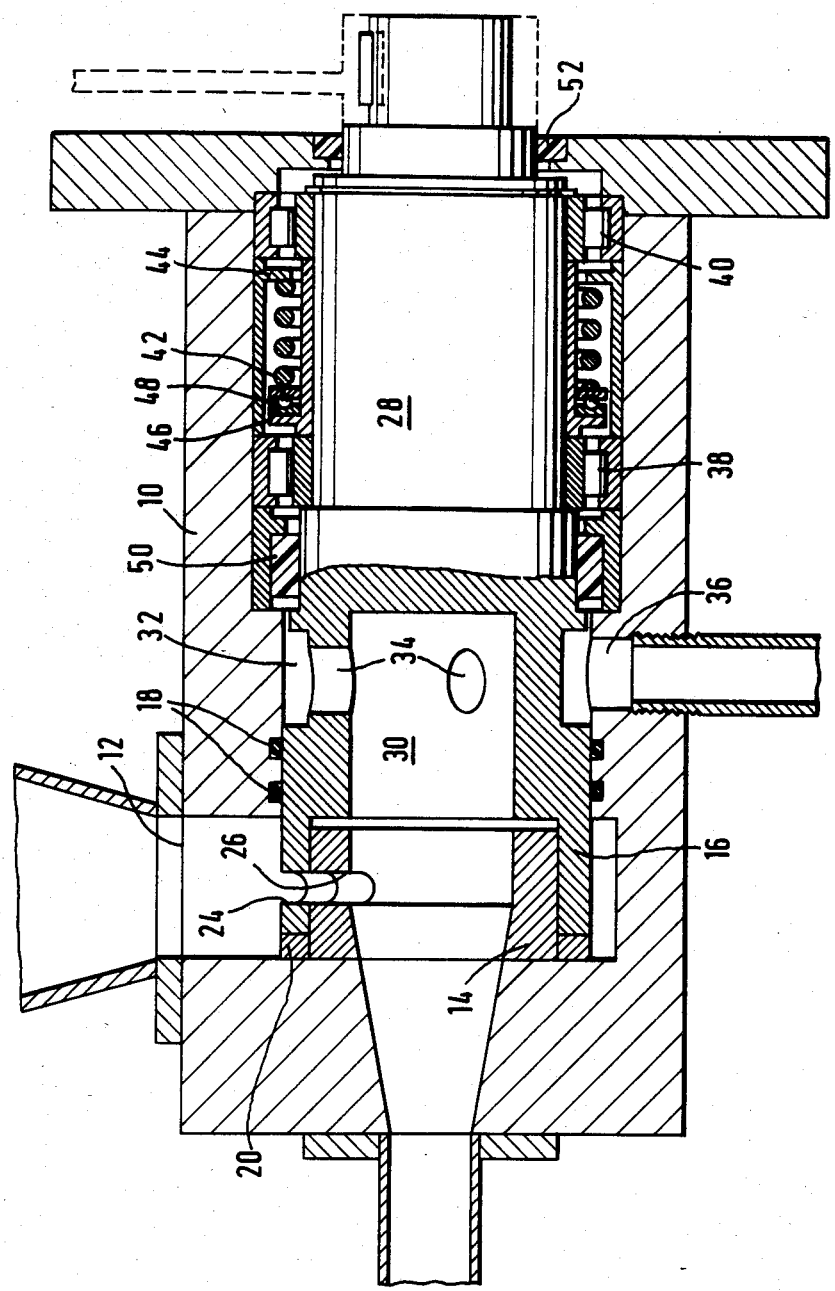

DEVICE FOR INTRODUCING DOSED QUANTITIES OF PULVERIZED SOLID MATERIALS INTO A CARRIER GAS STREAM

BACKGROUND OF THE INVENTION

The present invention relates to an apparatus for introducing measured or dosed quantities of pulverized or pulverulent materials into a carrier gas stream.

An apparatus for proportioning and extracting pulverized materials of the type herein discussed, has been disclosed in European patent application No. 0108319 as well as in Luxembourg patent application No. 84-462 corresponding to U.S. patent application Ser. No. 550,565, and Luxembourg patent application No. 84-780 corresponding to U.S. patent application Ser. No. 604,465, the two U.S. patent applications being assigned to the assignee hereof, all the contents of which are incorporated herein by reference. The invention described in European patent application No. 0108319 and the pending U.S. applications are particularly applicable to the operation of injecting solid fuels into a shaft furnace during a metal refining process.

In the dosing apparatus described in the above-mentioned patent applications, rotation of the movable sleeve is permitted by integrally attaching a rotor thereto having an axial cylindrical extension engaging a corresponding axial boring in a rotary drive shaft. This drive shaft is mounted in the housing of the apparatus with the aid of ball bearings and is fixed in the axial direction. The rotor is non-rotatable relative to the drive shaft, e.g. made fast in rotation therewith by means of a key, but retains freedom of movement in the axial direction and is subject to the action of a spring in the direction opposite to the shaft.

While suitable for its intended purposes, this prior art dosing device suffers from certain drawbacks. For example, the rotor which is attached to the movable sleeve is kept in an overhanging position by the end of the shaft. In turn, the overhanging portion itself has an overhang as a result of the comparatively small distance separating the two ball bearings. Since a certain clearance also has to be left between the rotor and the box, in order to preclude seizing, and since the movable sleeve is subjected to pressure in the reservoir holding the pulverulent materials, this pressure exerts a moment on the rotor and the housing on the side opposite to that on which the admission of the pulverulent material takes place. This moment also tends to increase the clearance between the rotor and the drive shaft.

The keying between the rotor and the drive shaft is similarly subject to increases in play in the direction of rotation, resulting in a progressive worsening or decay in the degree of accuracy in the proportioning of the material.

SUMMARY OF THE INVENTION

The above discussed and other problems of the prior art are overcome or alleviated by the dosing apparatus of the present invention. In accordance with the present invention, an improved dosing device of the type disclosed in European patent application No. 0108319 and U.S. patent application Ser. Nos. 550,565 and 604,465 is provided wherein the problems discussed immediately above are essentially overcome.

The present invention comprises a preferably cylindrical housing partially traversed in the axial direction and connected to a source of pressurized fluid or carrier gas. The housing also has a first radial aperture which communicates with a reservoir containing pulverized solid material. The pressure in the reservoir of solid material should be about that of the carrier gas. The housing further contains two coaxial sleeves defined as an inner sleeve and an outer sleeve. At least one of the two sleeves is capable of rotating about its longitudinal axis and is connected for this purpose to a suitable driving device for imparting rotation. Each of the sleeves is further provided with a slot positioned so as to correspond with each other and with the radial aperture on the housing. Thus, the slots are permitted to meet and overlap each other as the rotatable sleeve rotates about its axis. The overlapping and identical slots on the inner and outer sleeve thus defines a passage of varying size (depending on the position of the rotating sleeve).

An important feature of the present invention is that the movable sleeve forms an actual portion of a driving shaft which is mounted coaxially in the housing preferably by means of two bearings and which has freedom of movement in the axial and angular directions. The drive shaft is also subject to the action of a compression spring resting at one end on an internal circular flange of the housing, and at the opposite end on an external circular flange of the drive shaft.

In order to render the shaft free to move in the axial direction, the bearings preferably consist of roller bearings or needle bearings.

As mentioned, a compression spring is provided between the two bearings, enabling them to be moved farther apart, thus providing a better support for the drive shaft and reducing the length of the overhang of the front portion thereof which forms the rotary or movable sleeve.

The above discussed and other advantages of the present invention will be apparent to and understood by those skilled in the art from the following detailed description and drawings.

BRIEF DESCRIPTION OF THE DRAWING

Referring now to the drawing; the single FIGURE is a cross-sectional elevation view of a dosing apparatus in accordance with the present invention.

DESCRIPTION OF THE PREFERRED EMBODIMENT

The dosing device for measuring or proportioning pulverized or pulverulent materials and introducing measured quantities thereof into a carrier gas stream is generally shown in the FIGURE and is related to the dosing devices disclosed in the aforementioned European and U.S. patent applications. The dosing device of FIG. 1 comprises a preferably cylindrical housing 10 having a radial or side aperture 12 which is connected to a pressurized container of solid material, such as pulverulent material. Housing 10 contains therein, two coaxial cylindrical sleeves 14 and 16 defined as an inner sleeve 14 and an outer sleeve 16. In the illustrated embodiment, the inner sleeve 14 is fixed in position while the outer sleeve 16 can freely rotate (via a driving device) about the longitudinal axis of the housing. The required tension between rotatable sleeve 16 and housing 10 is ensured by one or more joints 18. The leading portion of rotatable sleeve 16 contacts or rubs against a friction ring 20, as is described in European patent application No. 0108319. The two sleeves 14 and 16 are each provided with first dosing slots 26 and 24, respectively. Slots 24 and 26 define a passage for the entry of pulverized material through radial aperture 12, the passage having a size that will vary according to the angular position occupied by the movable or rotatable sleeve 16. This variable passage permits the flow of pulverized material to vary between a maximum when the slots are completely superimposed to a minimum when the slots no longer coincide and the pulverized material is prevented from flowing therethrough. Further details of the features and structure of the present invention which are also found in the prior art dosing devices are more fully described in the aforementioned patent applications.

In contrast to the prior art dosing devices described in the previously discussed patent applications, in accordance with the present invention, the movable sleeve 16 is mounted directly on or forms an integral part of a rotary drive shaft 28, of which the front section thereof is provided with an axial boring 30 for the admission of air under pressure. Boring 30 is surrounded by an annular admission chamber 32 communicating via a series of orifices 34 with the interior of the boring 30; and with a lateral orifice 36 connected to a compressed air admission pipe.

As discussed, movable inner sleeve 16 forms a portion of shaft 28 and is mounted coaxially in housing 10 by means of a pair of bearings 38 and 40 in such a way as to enable it to rotate about its longitudinal axis. Between bearings 38 and 40 is a compression spring 42 resting at one end of an internal circular flange or shoulder 44 of housing 10 and at the other end on an external circular flange or shoulder 46 of shaft 28. To enable shaft 28 to rotate in relation to spring 42, a ball bearing 48 is interposed between flange 46 and spring 42. The action of spring 42 tends to thrust shaft 28 towards the left (as viewed in the FIGURE), i.e. to keep movable sleeve 16 supported on ring 20 and to balance out any wear suffered by the latter. For spring 42 to achieve this action, shaft 28 must be free in the axial direction. As a result, rollers or needles are preferably selected as the elements for bearings 38 and 40. In addition, the rollers or needles secure shaft 28 more firmly, since the line of contact with shaft 28 is longer than in the case of ball bearings.

The system described above is rendered hermetic with respect to the compressed air by means of a circular joint 50 and is closed off from the outside by a ring or joint 52.

Exterior of housing 10, shaft 28 is actuated by a suitable driving mechanism causing it to rotate about its longitudinal axis in order to reduce or increase the width of the passage formed by slots 24 and 26.

Because the rotary sleeve forms an integral part of the drive shaft the fact that the overhang (as discussed with regard to prior art dosing devices) is reduced (due to the distance between the bearings), the present invention makes it possible to reduce the deleterious play occurring in the area of joints 18, which, it should be understood, cannot be lubricated.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for introducing pulverized materials in a carrier gas stream comprising:
    housing means, said housing means having an axial flow passage for a pressurized carrier gas stream;
    aperture means in said housing means for delivery of pulverized material;
    inner sleeve means in said housing means and extending across said aperture means, said inner sleeve means having an axial bore, said bore providing a passage for the carrier gas stream;
    outer sleeve means, said outer sleeve means being coaxial with said inner sleeve means and extending across said aperture means, at least one of said outer and inner sleeve means being rotatable about its longitudinal axis;
    means for rotating at least one of said outer and inner sleeve means;
    at least a first slot on said inner sleeve means and at least a second slot on said outer sleeve means, said first and second slots being capable of mutual overlapping alignment with each other and with said aperture means to define a variable sized passage whereby pulverized material is delivered therethrough to said carrier gas stream;
    said rotatable sleeve means forming a portion of a drive shaft, said drive shaft being coaxially mounted in said housing means and being connected to said rotating means, said shaft having freedom of movement in the axial and angular directions;
    bearing means for coaxially mounting said drive shaft in said housing means; and
    spring means disposed between one end of said housing means and said shaft.

2. The device of claim 1 including:
    an internal shoulder in said housing means, said spring means contacting said internal shoulder; and
    an external shoulder on said shaft, said spring means contacting said external shoulder.

3. The device of claim 2 wherein said spring means includes a spring and a
    ball bearing means between said spring and said external shoulder of said drive shaft.

4. The device of claim 1 wherein:
    said bearing means are of the roller or needle type.

5. The device of claim 1 wherein said bearing means includes two bearings and wherein said spring means is provided between said two bearings.

6. The device of claim 1 wherein said spring means includes a compression spring means.

* * * * *